Feb. 25, 1941.                M. R. BARNES                 2,233,280
                        PICTURE ILLUMINATING DEVICE
                         Filed Dec. 17, 1938          2 Sheets-Sheet 1
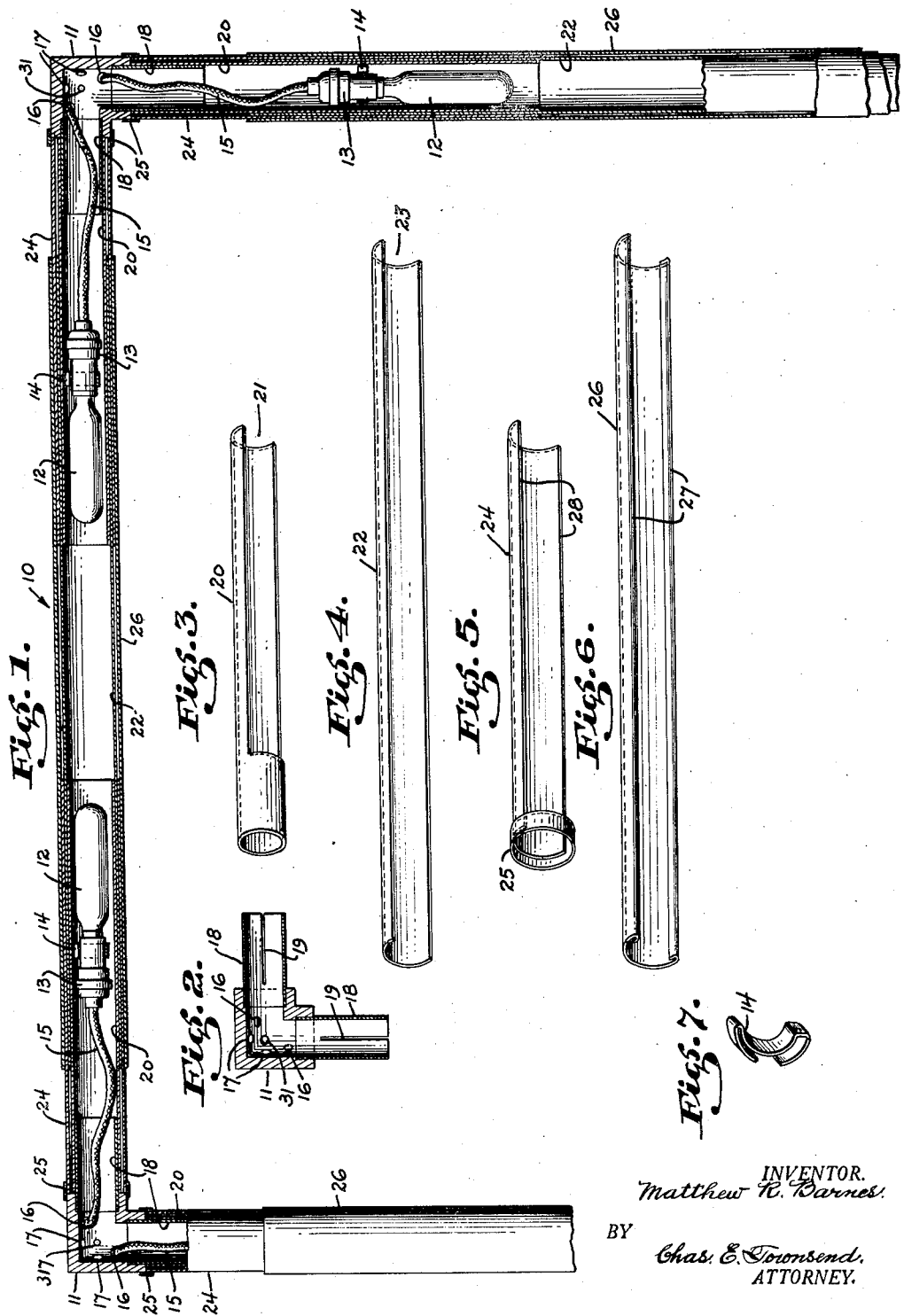
INVENTOR.
Matthew R. Barnes.
BY
Chas. E. Townsend.
   ATTORNEY.

Feb. 25, 1941.　　　M. R. BARNES　　　2,233,280
PICTURE ILLUMINATING DEVICE
Filed Dec. 17, 1938　　　2 Sheets-Sheet 2

INVENTOR.
Matthew R. Barnes.
BY
Chas. E. Townsend.
ATTORNEY.

Patented Feb. 25, 1941

2,233,280

UNITED STATES PATENT OFFICE 2,233,280

PICTURE ILLUMINATING DEVICE

Matthew R. Barnes, San Francisco, Calif.

Application December 17, 1938, Serial No. 246,349

5 Claims. (Cl. 240—1)

The present invention relates to devices for illuminating pictures or the like, and particularly to a device adapted to be attached to a picture frame for the purpose of illuminating the picture in a manner that will display it to advantage from an artistic point of view.

It is common practice, particularly in connection with the exhibition of oil paintings, to mount on or adjacent the frame of a painting a shaded lamp for the purpose of casting light onto the painting. Such lamps are usually arranged to produce an even flood of white light on the entire surface of the picture. Some pictures are exhibited to best advantage with highlights on certain portions, and in some cases lights of various colors may be employed to enhance the beauty of the painted subject.

It is the object of the present invention to provide a device that may be applied to picture frames and adjustably positioned to effect the illumination of a picture with a flood of light that varies in intensity on different areas of the picture and that may also be varied as to its color. One form of the invention is shown for purposes of illustration in the accompanying drawings, and further objects and advantages of the invention will be made apparent in the following specification, in which detailed reference is made to the drawings.

In the drawings:

Fig. 1 is a vertical transverse section of a portion of a picture illuminating device constructed in accordance with the present invention;

Fig. 2 is a similar section of one of the corner members used in the device illustrated in Fig. 1;

Fig. 3 is a perspective view of a portion of an adjustable and extendible light shade which forms a part of the device illustrated in Fig. 1;

Fig. 4 is a perspective view of another portion of the same light shade;

Fig. 5 is a perspective view of a portion of a shutter used in conjunction with the light shade shown in Figs. 3 and 4;

Fig. 6 is a perspective view of another portion of the same shutter;

Fig. 7 is a perspective view of a spring clip employed to position lamps adjustably within the shade shown in Fig. 3;

Figure 8:
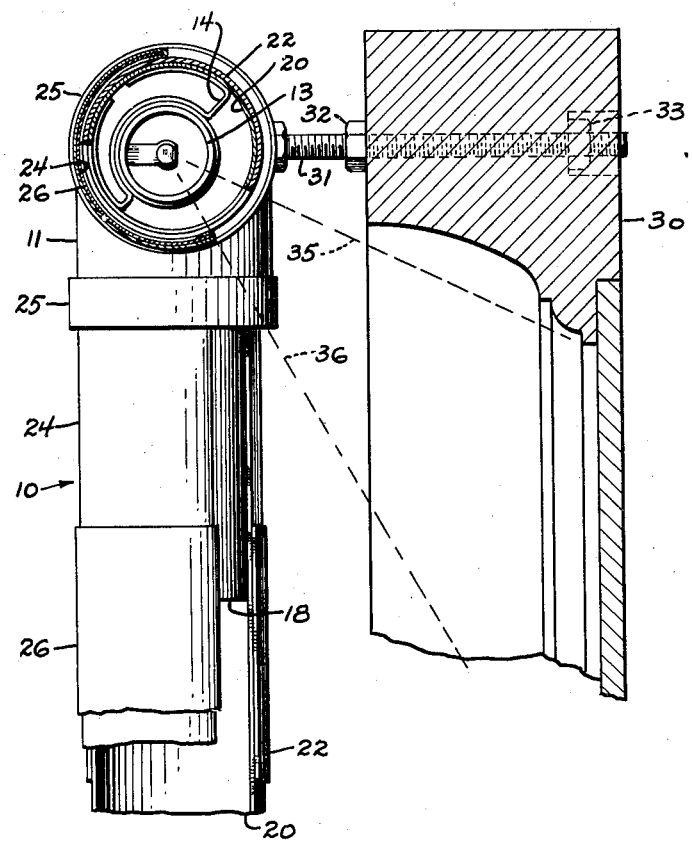
Fig. 8 is a transverse section taken through a portion of a picture frame and the device of the present invention, showing the manner in which the device is secured to the frame.

Referring to Fig. 1 of the drawings wherein there is illustrated a portion of a rectangular picture illuminating device, the device is shown as consisting of straight tubular members, generally indicated at 10, joined to form a complete rectangle by means of corner fittings 11. The tubular members shown at 10 form housings or lamp shades for electric lamps 12, the sockets 13 of which are supported for longitudinal adjustment in the tubes by means of spring clips 14, the construction of which is illustrated in Fig. 7. The electric conductors 15 which lead to the sockets 13 enter the tube through perforations 16 in the corner fittings 11 thereof, and a plurality of similar perforations 17 is preferably also provided in these corner fittings to permit free circulation of air through the tubular members and escape of hot air resulting from the burning of the electric lamps therein. Each of the tubes generally indicated at 10, which extend between the corner fittings 11, is adjustable as to length so that the framelike illuminating device may be fitted to frames of different sizes, and is also adjustable to permit variation in the amount and direction of the light emitted therefrom.

The elements of which the tubes 10 are made up are best illustrated in Figs. 2 to 6 inclusive. In Fig. 2 one of the corner fittings 11 is shown as provided with tubular trunnions 18 projecting from it at right angles to each other. These trunnions 18 may be longitudinally slotted as at 19 to provide for a firm frictional fit with the tubular end of a lamp housing member 20 shown in Fig. 2, which tubular end slides over the exterior of the trunnion 18. The housing member 20 is provided with a longitudinally-extending, light-emitting opening 21. One of the members 20 is fitted to each trunnion 18 of each of the corner fittings so that the members 20 project toward each other, as shown in Fig. 1, and when the device is applied to a frame it is longer than the combined lengths of the members 20. A telescoping housing member 22, the construction of which is illustrated in Fig. 4, is employed to fill the space intermediate the ends of the members 20. The housing member 22 slidably fits the exterior surface of the members 20 and has a longitudinal slot 23 co-extensive in width with the slot 21 so that when the device is lengthened or shortened the combined effect of the members 20 and 22 serves to provide a continuous tube with an elongated, light-emitting opening.

The description so far has been directed to the fittings which form one side only of the tubular lamp shade member, but it is to be understood that the rectangular device is made up of four identical sides and that each side is constructed in the manner described.

The members 20 may be rotated on the journals 18 by means of which they are supported so that the position of the light-emitting opening 21 may be varied to direct light onto the surface of the painting from any desired angle. The effective size of the light-emitting opening 21 may be altered through the medium of a rotatable shutter, parts of which are illustrated in Figs. 5 and 6. In Fig. 5 a shutter and member is shown at 24, which member as illustrated in Fig. 1 embraces exteriorly the shade members 20 and 22 just described. The member 24 is fitted with a ring 25 at one end which embraces an end of a corner fitting 11, and two of these shutter members 24 projecting from opposed corner fittings 11 are combined with a central telescoping shutter portion 26, illustrated in Fig. 6, to form a longitudinally extendible shutter throughout the entire length of each side of the device. The center portion 26 of the shutter has inwardly-flanged edges 27 which embrace the edges 28 of the shutter members 24 to retain the three members in assembled telescoping position. When the shutter member is completely assembled it may be rotated relative to the corner fittings 11 and to the shade which it embraces so as to close to any desired degree the light-emitting opening of the shade member and cause the amount of light directed upon the picture to flow from as large or as small an opening as may be desired. As the end members 20 of the tubular lamp shade are independently rotatable, they may be used in cooperation with the shutter to effect a greater flood of light from one end of the tube than is permitted at the other end of the tube.

Referring now to Fig. 8 of the drawings, a typical picture frame is illustrated in section at 30 and the illuminating device is shown as adjustably secured to said frame by means of threaded studs 31 which are secured to and project rearwardly from the corner fittings 11. The studs 31 may be provided with nuts 32 and 33 to be arranged in front of and behind the frame, respectively, and upon adjustment of these nuts longitudinally of the stud, the distance away from the frame that the illuminating device is positioned may be varied. Fig. 8 also illustrates the manner in which the spring clip 14 embraces the socket 13 and supports the lamp and frictionally fits the interior of the tubular shade member 20 so that the position of the lamp may be varied longitudinally of the shade member. It is also apparent from Fig. 8 that by rotatably adjusting the shade members 20 and 22 and the shutter members 24 and 26, the opening which is shown as positioned between dotted lines 35 and 36 may be varied in extent and position.

Figure 9:
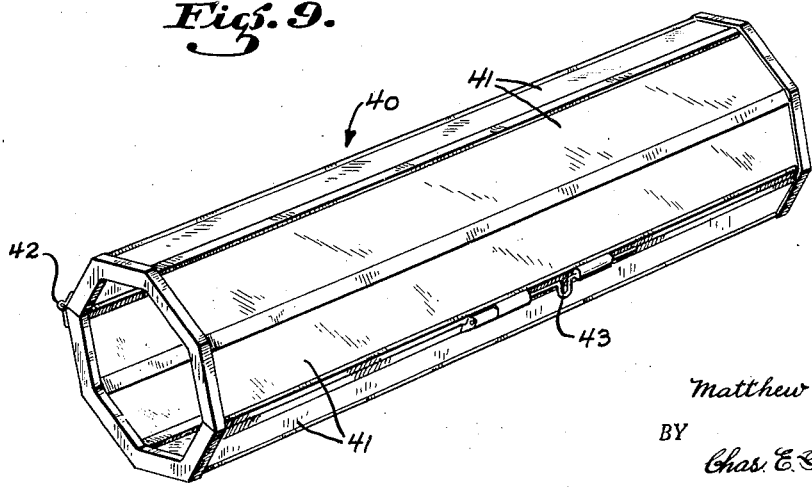
Fig. 9 is a perspective view of a device employed in combination with the invention for the purpose of testing the effect of various colors of light on a picture.

The color of light thrown upon the painting may be varied by employing lamps of different colors in place of the lamps illustrated at 12. In some cases it is desirable that the entire picture be flooded with light of one color, and in other cases it is found that lights of different colors may be employed to advantage on different areas of the same painting. The colors in which a painting is best exhibited are preferably determined by trial and in order to expedite the trial of various colors without the necessity of disassembling the device to insert lamps of different color, I provide a color-testing device which may be constructed in the manner illustrated in Fig. 9 of the drawings. This device comprises a multi-sided tube shown at 40, the sides 41 of which are composed of colored glass or other suitable color-filtering material. The multi-sided tube 40 is preferably divided into halves longitudinally connected by a hinge 42 and adapted to be latched in the position in which they cooperate to form a tube by a latch such as indicated at 43. This construction permits of the color-testing device's being opened and clamped around one of the tubular lamp shades, and when so positioned it may be rotated relative to the shade so that the different colored panels 41 come successively into registry with the light-emitting opening adjacent one of the lamps 12. The effect of the testing device, therefore, is to change the color of light emitted by the lamp, and this enables the determination of the color of the lamp that should be inserted for the picture being tested. The testing device illustrated in Fig. 9 is of course primarily intended for the use of artists or those arranging pictures for exhibition, and once the desired colors have been determined, lamps of corresponding colors are inserted in the device and it is assembled on the frame in which the picture is to be exhibited.

Externally the illuminating device has the appearance of a neat frame of tubular cross section positioned just in front of the frame in which the picture is exhibited, and it is intended that the exposed surfaces will be colored a neutral or unobtrusive color.

The invention has been described in its application to framed pictures for purposes of illustration, but it is also applicable to the illumination of various other subjects, such as, for example, displays of objects of art or merchandise.

While certain features of the present invention are more or less specifically described herein, it is to be understood that various changes may be resorted to in the arrangement and construction of the several parts described, within the scope of the appended claims.

Having thus described my invention, what I claim and desire to secure by Letters Patent is:

1. In a device for illuminating pictures which comprises a tubular shade member shaped to circumscribe a picture and having elongated light openings therein, resilient clips for supporting a lamp within the shade member, said clips being slidably engaged with the interior of the shade member to permit adjustment of the lamp longitudinally thereof.

2. A picture illuminating device comprising straight tubular shade members connected by corner fittings to provide a rectangular shape to circumscribe a picture to be illuminated, said shade members being telescopically adjustable, whereby the size of the device may be adjusted to accommodate pictures of different dimensions.

3. A picture illuminating device comprising straight tubular shade members connected by corner fittings to provide a rectangular shape to circumscribe a picture to be illuminated, said shade members being telescopically adjustable, whereby the size of the device may be adjusted to accommodate pictures of different dimensions, and means for securing said device to a picture frame to support it in spaced relation to the frame.

4. A picture illuminating device comprising tube-like shade members arranged to circumscribe a picture, each member comprising a plurality of telescoping tubes slotted to provide a light-emitting opening, and a tube-like slotted telescoping shutter embracing said plurality of tubes and rotatable thereon to vary the effective size of said light-emitting opening.

5. In a device for illuminating pictures a rectangular frame adjustable to circumscribe pictures of different dimensions and comprising corner fittings having tubular trunnions extending at right angles therefrom, tubular shade members with longitudinally extending light emitting slots rotatable on said trunnions and made up of telescopically adjustable sections, and telescopically adjustable longitudinally slotted mask members rotatably carried by the shade members whereby the size and position of the light emitting slots may be varied by relative rotary adjustment of the shade members and mask members.

MATTHEW R. BARNES.